(12) United States Patent
Rehman

(10) Patent No.: US 8,959,114 B2
(45) Date of Patent: Feb. 17, 2015

(54) ENTITLEMENT MANAGEMENT IN AN ON-DEMAND SYSTEM

(75) Inventor: Muhammad Rehman, San Jose, CA (US)

(73) Assignee: salesforce.com, inc., San Francisco, CA (US)

( * ) Notice: Subject to any disclaimer, the term of this patent is extended or adjusted under 35 U.S.C. 154(b) by 0 days.

(21) Appl. No.: 13/557,048

(22) Filed: Jul. 24, 2012

(65) Prior Publication Data

US 2013/0103640 A1    Apr. 25, 2013

Related U.S. Application Data

(60) Provisional application No. 61/549,833, filed on Oct. 21, 2011.

(51) Int. Cl.
  *G06F 17/30* (2006.01)
  *G06Q 30/02* (2012.01)

(52) U.S. Cl.
  CPC ...... *G06F 17/3056* (2013.01); *G06F 17/30566* (2013.01); *G06Q 30/0232* (2013.01)
  USPC .......................................................... 707/784

(58) Field of Classification Search
  CPC ........................... G06F 17/3056; G06F 21/604
  USPC .................... 707/609, 785, 781, 784
  See application file for complete search history.

(56) References Cited

U.S. PATENT DOCUMENTS

| | | |
|---|---|---|
| 5,577,188 A | 11/1996 | Zhu |
| 5,608,872 A | 3/1997 | Schwartz et al. |
| 5,649,104 A | 7/1997 | Carleton et al. |
| 5,715,450 A | 2/1998 | Ambrose et al. |
| 5,761,419 A | 6/1998 | Schwartz et al. |
| 5,819,038 A | 10/1998 | Carleton et al. |
| 5,821,937 A | 10/1998 | Tonelli et al. |
| 5,831,610 A | 11/1998 | Tonelli et al. |
| 5,873,096 A | 2/1999 | Lim et al. |
| 5,918,159 A | 6/1999 | Fomukong et al. |
| 5,963,953 A | 10/1999 | Cram et al. |
| 6,092,083 A | 7/2000 | Brodersen et al. |
| 6,169,534 B1 | 1/2001 | Raffel et al. |
| 6,178,425 B1 | 1/2001 | Brodersen et al. |
| 6,189,011 B1 | 2/2001 | Lim et al. |
| 6,216,135 B1 | 4/2001 | Brodersen et al. |
| 6,233,617 B1 | 5/2001 | Rothwein et al. |
| 6,266,669 B1 | 7/2001 | Brodersen et al. |

(Continued)

OTHER PUBLICATIONS

USPTO, Non-Final Office Action for U.S. Appl. No. 13/589,994, mailed Aug. 15, 2013.

(Continued)

*Primary Examiner* — Scott A Waldron
(74) *Attorney, Agent, or Firm* — Ingrassia Fisher & Lorenz, P.C.

(57) ABSTRACT

Methods and systems are provided for on-demand entitlement management. One exemplary method involves a server obtaining entitlement definition information for an entitlement offered by a provider system, receiving user entitlement configuration information corresponding to the entitlement for a customer of the provider system, and creating one or more entitlement objects for the customer in a database based on the entitlement definition information and the user entitlement configuration information, wherein the entitlement definition information includes metadata defining a structure of the one or more entitlement objects.

18 Claims, 8 Drawing Sheets

(56) References Cited

U.S. PATENT DOCUMENTS

| | | |
|---|---|---|
| 6,295,530 B1 | 9/2001 | Ritchie et al. |
| 6,324,568 B1 | 11/2001 | Diec et al. |
| 6,324,693 B1 | 11/2001 | Brodersen et al. |
| 6,336,137 B1 | 1/2002 | Lee et al. |
| D454,139 S | 3/2002 | Feldcamp |
| 6,367,077 B1 | 4/2002 | Brodersen et al. |
| 6,393,605 B1 | 5/2002 | Loomans |
| 6,405,220 B1 | 6/2002 | Brodersen et al. |
| 6,434,550 B1 | 8/2002 | Warner et al. |
| 6,446,089 B1 | 9/2002 | Brodersen et al. |
| 6,535,909 B1 | 3/2003 | Rust |
| 6,549,908 B1 | 4/2003 | Loomans |
| 6,553,563 B2 | 4/2003 | Ambrose et al. |
| 6,560,461 B1 | 5/2003 | Fomukong et al. |
| 6,574,635 B2 | 6/2003 | Stauber et al. |
| 6,577,726 B1 | 6/2003 | Huang et al. |
| 6,601,087 B1 | 7/2003 | Zhu et al. |
| 6,604,117 B2 | 8/2003 | Lim et al. |
| 6,604,128 B2 | 8/2003 | Diec |
| 6,609,150 B2 | 8/2003 | Lee et al. |
| 6,621,834 B1 | 9/2003 | Scherpbier et al. |
| 6,654,032 B1 | 11/2003 | Zhu et al. |
| 6,665,648 B2 | 12/2003 | Brodersen et al. |
| 6,665,655 B1 | 12/2003 | Warner et al. |
| 6,684,438 B2 | 2/2004 | Brodersen et al. |
| 6,711,565 B1 | 3/2004 | Subramaniam et al. |
| 6,724,399 B1 | 4/2004 | Katchour et al. |
| 6,728,702 B1 | 4/2004 | Subramaniam et al. |
| 6,728,960 B1 | 4/2004 | Loomans |
| 6,732,095 B1 | 5/2004 | Warshavsky et al. |
| 6,732,100 B1 | 5/2004 | Brodersen et al. |
| 6,732,111 B2 | 5/2004 | Brodersen et al. |
| 6,754,681 B2 | 6/2004 | Brodersen et al. |
| 6,763,351 B1 | 7/2004 | Subramaniam et al. |
| 6,763,501 B1 | 7/2004 | Zhu et al. |
| 6,768,904 B2 | 7/2004 | Kim |
| 6,782,383 B2 | 8/2004 | Subramaniam et al. |
| 6,804,330 B1 | 10/2004 | Jones et al. |
| 6,826,565 B2 | 11/2004 | Ritchie et al. |
| 6,826,582 B1 | 11/2004 | Chatterjee et al. |
| 6,826,745 B2 | 11/2004 | Coker et al. |
| 6,829,655 B1 | 12/2004 | Huang et al. |
| 6,842,748 B1 | 1/2005 | Warner et al. |
| 6,850,895 B2 | 2/2005 | Brodersen et al. |
| 6,850,949 B2 | 2/2005 | Warner et al. |
| 7,340,411 B2 | 3/2008 | Cook |
| 7,349,904 B2 * | 3/2008 | Illg et al. ................ 707/999.003 |
| 7,620,655 B2 | 11/2009 | Larsson et al. |
| 7,698,160 B2 | 4/2010 | Beaven et al. |
| 7,703,667 B2 * | 4/2010 | Koorland et al. ............ 235/375 |
| 7,769,691 B2 * | 8/2010 | Anders et al. .................. 705/52 |
| 8,082,301 B2 | 12/2011 | Ahlgren et al. |
| 8,095,413 B1 | 1/2012 | Beaven |
| 8,095,594 B2 | 1/2012 | Beaven et al. |
| 8,275,836 B2 | 9/2012 | Beaven et al. |
| 8,490,152 B2 * | 7/2013 | Staiman et al. ................... 726/1 |
| 2001/0044791 A1 | 11/2001 | Richter et al. |
| 2002/0072951 A1 | 6/2002 | Lee et al. |
| 2002/0082892 A1 | 6/2002 | Raffel |
| 2002/0129352 A1 | 9/2002 | Brodersen et al. |
| 2002/0140731 A1 | 10/2002 | Subramaniam et al. |
| 2002/0143997 A1 | 10/2002 | Huang et al. |
| 2002/0152181 A1 | 10/2002 | Kanai et al. |
| 2002/0162090 A1 | 10/2002 | Parnell et al. |
| 2002/0165742 A1 | 11/2002 | Robbins |
| 2003/0004971 A1 | 1/2003 | Gong et al. |
| 2003/0009691 A1 * | 1/2003 | Lyons et al. ................. 713/201 |
| 2003/0018705 A1 | 1/2003 | Chen et al. |
| 2003/0018830 A1 | 1/2003 | Chen et al. |
| 2003/0066031 A1 | 4/2003 | Laane et al. |
| 2003/0066032 A1 | 4/2003 | Ramachandran et al. |
| 2003/0069936 A1 | 4/2003 | Warner et al. |
| 2003/0070000 A1 | 4/2003 | Coker et al. |
| 2003/0070004 A1 | 4/2003 | Mukundan et al. |
| 2003/0070005 A1 | 4/2003 | Mukundan et al. |
| 2003/0074418 A1 | 4/2003 | Coker et al. |
| 2003/0120675 A1 | 6/2003 | Stauber et al. |
| 2003/0151633 A1 | 8/2003 | George et al. |
| 2003/0159136 A1 | 8/2003 | Huang et al. |
| 2003/0187921 A1 | 10/2003 | Diec et al. |
| 2003/0189600 A1 | 10/2003 | Gune et al. |
| 2003/0204427 A1 | 10/2003 | Gune et al. |
| 2003/0206192 A1 | 11/2003 | Chen et al. |
| 2003/0225730 A1 | 12/2003 | Warner et al. |
| 2004/0001092 A1 | 1/2004 | Rothwein et al. |
| 2004/0010489 A1 | 1/2004 | Rio et al. |
| 2004/0015981 A1 | 1/2004 | Coker et al. |
| 2004/0027388 A1 | 2/2004 | Berg et al. |
| 2004/0128001 A1 | 7/2004 | Levin et al. |
| 2004/0186860 A1 | 9/2004 | Lee et al. |
| 2004/0193510 A1 | 9/2004 | Catahan et al. |
| 2004/0199489 A1 | 10/2004 | Barnes-Leon et al. |
| 2004/0199536 A1 | 10/2004 | Barnes Leon et al. |
| 2004/0199543 A1 | 10/2004 | Braud et al. |
| 2004/0249854 A1 | 12/2004 | Barnes-Leon et al. |
| 2004/0260534 A1 | 12/2004 | Pak et al. |
| 2004/0260659 A1 | 12/2004 | Chan et al. |
| 2004/0268299 A1 | 12/2004 | Lei et al. |
| 2005/0050555 A1 | 3/2005 | Exley et al. |
| 2005/0091098 A1 | 4/2005 | Brodersen et al. |
| 2005/0261933 A1 * | 11/2005 | Magnuson ........................ 705/1 |
| 2007/0124269 A1 * | 5/2007 | Rutter et al. ..................... 707/1 |
| 2010/0005055 A1 | 1/2010 | An et al. |
| 2010/0161759 A1 * | 6/2010 | Brand ............................ 709/218 |
| 2010/0324953 A1 * | 12/2010 | Janssen et al. ..................... 705/7 |
| 2011/0282907 A1 * | 11/2011 | Ramsey et al. |

OTHER PUBLICATIONS

USPTO, Notice of Allowance and Fee(s) Due for U.S. Appl. No. 13/589,994, mailed Aug. 26, 2014.

* cited by examiner

ENTITLEMENT MANAGEMENT IN AN ON-DEMAND SYSTEM

CROSS-REFERENCE TO RELATED APPLICATION(S)

This application claims the benefit of U.S. provisional patent application Ser. No. 61/549,833, filed Oct. 21, 2011, the entire content of which is incorporated by reference herein.

TECHNICAL FIELD

Embodiments of the subject matter described herein relate generally to computer systems configured to support on-demand applications, and more particularly, embodiments of the subject matter relate to methods and systems for providing and managing entitlements in an on-demand application system.

BACKGROUND

In various industries, providers of products, services and/or resources often allocate and monitor consumption of those respective products, services and/or resources by customers. For example, a mobile network operator may allocate a mobile phone subscriber a particular number of voice minutes or a particular amount of data usage over a particular time period. To manage different product and/or service packages offered to customers and the subscription to and/or consumption of those product and/or service packages by customers, a resource provider often utilizes a customized software solution to manage those customer entitlements, which can be costly. Additionally, the customized entitlement management software may be inflexible, requiring additional cost and development time to incorporate new products and/or services or modify existing products and/or services.

BRIEF DESCRIPTION OF THE DRAWINGS

A more complete understanding of the subject matter may be derived by referring to the detailed description and claims when considered in conjunction with the following figures, wherein like reference numbers refer to similar elements throughout the figures.

DETAILED DESCRIPTION

Figure 1:
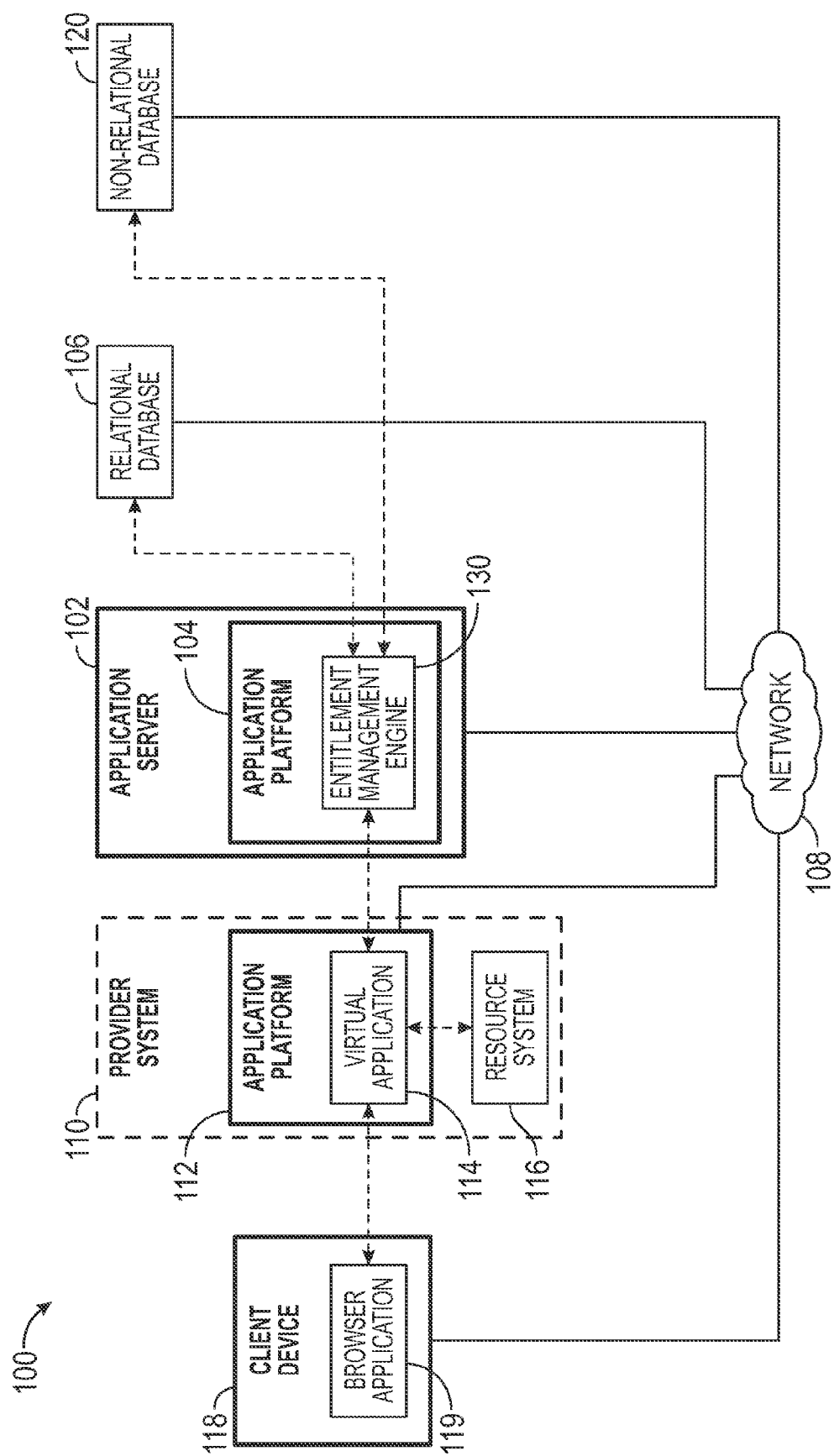
FIG. 1 is a block diagram of an exemplary application system.

Embodiments of the subject matter described herein generally relate to managing entitlements using in an on-demand application system. As used herein, an entitlement should be understood as referring to a particular combination, arrangement, or package of one or more resources offered by a resource provider. In this regard, in various embodiments, a respective resource associated with an entitlement may be a product, service, feature, or another resource offered by that respective resource provider. As described in greater detail below, in exemplary embodiments, an on-demand application server receives, from or otherwise on behalf of a resource provider, entitlement definition information for an entitlement offered by that resource provider. In this regard, the entitlement definition information may include, without limitation, a name or other identifier associated with the entitlement, the name(s) or other identifier(s) associated with the resource(s) associated with that entitlement, and any qualifying criteria associated with the respective resource(s) associated with that entitlement. For example, as described in greater detail below, the qualifying criteria may include qualifying values (e.g., default, minimum and/or maximum values) for quantities of a respective resource that may be consumed, a monitoring period over which the consumption of that respective resource is limited to those qualifying values, an indication of whether those qualifying values can be exceeded over a monitoring period (e.g., overage), an indication of whether failure to consume the qualifying values can be applied to a subsequent monitoring period (e.g., rollover), a relationship (or dependency) between respective resources associated with the entitlement, and/or other characteristics or attributes for a respective resource associated with the entitlement. As described in greater detail below, the entitlement definition information includes metadata that defines the fields and/or structure of custom (or tenant-specific) entitlement objects associated with that resource provider that are created for customers or users of that resource provider who have access to that entitlement (e.g., by purchasing the entitlement from the resource provider).

After receiving entitlement definition information for an entitlement offered by a resource provider, the on-demand application server updates a relational database to store or otherwise maintain the entitlement definition information in association with the resource provider, for example, by creating an entry in the relational database that includes the entitlement definition information and has a unique tenant identifier associated with the resource provider for one column of the entry. Subsequently, the on-demand application server receives, from or on behalf of the resource provider, user entitlement configuration information for a customer or user of the resource provider that is capable of accessing or otherwise receiving that entitlement. As described in greater detail below, the user entitlement configuration information may include, without limitation, a name or other identifier the resource provider has associated with or otherwise assigned to the user along with user-specific qualifying criteria for the entitlement. In this regard, the user's entitlement may have different qualifying values, monitoring periods, or other attributes that are different from the standard or default values provided by the entitlement definition information. In response to receiving the user entitlement configuration information, the on-demand application server creates one or more entries in the relational database corresponding to one or more instances of custom entitlement objects associated with that user based on the user entitlement configuration information and the entitlement definition information. For example, the on-demand application server may create a user entitlement object associated with the resource provider using the entitlement metadata maintained by the relational database and the user entitlement configuration information.

In this regard, the entitlement metadata defines the fields or structure of the user entitlement object while the user entitlement configuration information provides or otherwise defines any user-specific values for one or more of the fields of the user entitlement object. In this manner, the user-specific values may be used to overwrite or otherwise augment default values for one or more fields of the user entitlement object provided by the entitlement definition information. Additionally, the on-demand application server may create a user entitlement usage object for each resource associated with the user entitlement object. In a similar manner, the entitlement metadata defines the fields or structure of the user entitlement usage object (e.g., the monitoring period for that resource and indication of whether or not consumption of that resource is capable of overage and/or rollover) while the user entitlement configuration information provides or otherwise defines any user-specific values for one or more of the fields of the user entitlement usage object (e.g., a user-specific monitoring period or whether or not the user's consumption is capable of overage and/or rollover).

As described in greater detail below in the context of FIG. 3, after the custom entitlement objects associated with a customer or user of the resource provider, the resource provider may provide resources to the customer, and after providing resources to the customer, the resource provider indicates or otherwise provides usage information indicative of the resources consumed by the customer to the application server. In exemplary embodiments, the application server stores or otherwise maintains the usage information in a non-relational database, analyzes or otherwise summarizes the instances of usage information associated with that user and that resource to determine a usage summary for that user's consumption of that resource, and updates the user entitlement usage object for that resource to reflect the updated usage summary. Subsequently, before providing additional resources to the customer, the resource provider may communicate, transmit, or otherwise provide an entitlement status request for that customer with respect to that resource to the application server, wherein the application server accesses the entitlement objects associated with that customer to determine whether the user is entitled to that resource based on the user's current usage for that resource over the current monitoring period, the qualifying values, attributes and/or other qualifying criteria for that resource maintained by the relational database. The application server may respond to the entitlement status request by communicating, transmitting, or otherwise providing an indication of whether or not the user is entitled to the resource to the resource provider, wherein the resource provider grants and/or denies access to the requested resource based on the user's entitlement status.

Turning now to FIG. 1, an exemplary on-demand application system 100 includes an application server 102 that includes or otherwise implements an application platform 104 capable of generating instances of virtual applications at run-time (e.g., or "on-demand") based upon data stored or otherwise maintained by a database 106 that is communicatively coupled to the application server 102 via a communications network 108, such as a wired and/or wireless computer network, a cellular network, a mobile broadband network, a radio network, or the like. In accordance with one or more embodiments, the database 106 is realized as a multi-tenant database that is shared between multiple tenants, that is, the database 106 may store or otherwise maintain data associated with a number of different tenants, as described in greater detail below in the context of FIG. 8.

In the illustrated embodiment, the application system 100 includes a resource provider system 110 that includes or otherwise implements an application platform 112 that generates a virtual application 114 based at least in part on data stored or otherwise maintained by the database 106 (and received via the application server 102) that controls or otherwise manages access to resources from a resource system 116 by a client device 118. As described in greater detail below, in exemplary embodiments, the provider system 110 provides entitlement definition information to the application server 102, which creates or otherwise maintains custom (or tenant-specific) entitlement objects associated with the provider system 110 in the database 106 based on the entitlement definition information. In this regard, the provider system 110 subsequently provides user entitlement configuration information for the user of the client device 118 to the application server 102, which, in turn, creates the custom entitlement objects associated with the user of the client device 118 based on the user entitlement configuration information and the entitlement definition information. The provider system 110 also provides entitlement usage information for the user of the client device 118 to the application server 102, which, in turn, monitors the user's entitlement usage information and determines whether the user of the client device 118 is entitled to resources provided by the provider system 110 based on the user entitlement configuration information reflected by the entitlement objects associated with the user of the client device 118. In this regard, in response to receiving indication that the user of the client device 118 is entitled to a particular resource, the provider system 110 allows the client device 118 to access the resource system 116 and obtain a requested resource that the user of the client device 118 is entitled to.

In the illustrated embodiment of FIG. 1, the provider system 110 generally represents a computing system and/or other components configured to implement an application platform 112 that generates or otherwise supports the virtual application 114 that interfaces with the client device 118 to manage provision of resources from the resource system 116 to the client device 118 for consumption. In this regard, the provider system 110 and/or application platform 112 may include a processing system (e.g., a processor, controller, or the like) that includes or otherwise accesses a memory or another non-transitory computer-readable medium of storing programming instructions or code for execution by the processing system that, when read and executed by the processing system, cause the application platform 112 to generate an instance of the virtual application 114 to interface with the client device 118 and perform various additional tasks, operations, functions, and processes described in greater detail below. The resource system 116 generally represents the hardware and/or other components of the provider system 110 that are associated with the products, services, and/or other resources that the user of the client device 118 requests access to. For example, if the provider system 110 is associated with or otherwise corresponds to a communications network operator (e.g., a mobile network operator), the resource system 116 may correspond to the communications network (e.g., a cellular or mobile network) that is utilized by the client device 118 to communicate with other client devices. In this regard, it should be noted that in such embodiments, the client device 118 may communicate with the provider system 110 and/or application platform 112 via the resource system 116 (e.g., the communications network controlled by the provider system 110) rather than the network 108 as illustrated in FIG. 1. In other example embodiments, if the provider system 110 is associated with or otherwise corresponds to a multimedia content provider, the resource system 116 may correspond to the databases and/or other data storage elements having multimedia content (e.g., audio and/or video files) stored thereon that may be downloaded, streamed, or otherwise accessed by the client device 118. In one exemplary embodiment, the provider system 110 is associated with or otherwise corresponds to a social media monitoring system that identifies and/or monitors various other computing systems (e.g., via network 108) for information associated with a particular customer and/or user of the client device 118 and analyzes that information, wherein the resource system 116 corresponds to the databases and/or other data storage elements having that information (or the analysis and/or summary thereof) stored thereon that may be viewed or otherwise accessed by the client device 118.

The client device 118 generally represents an electronic device that is utilized by a user to access or otherwise consume the resources provided by the provider system 110. In practice, the client device 118 can be realized as any sort of personal computer, mobile telephone, tablet or other network-enabled electronic device. In an exemplary embodiment, the client device 118 may include a display device, such as a monitor, screen, or another conventional electronic display, capable of graphically presenting data and/or information provided by the resource system 116 and/or the virtual application 114 along with a user input device, such as a keyboard, a mouse, a touchscreen, or the like, capable of receiving input data and/or other information from the user of the client device 118. In the illustrated embodiment, the user manipulates the client device 118 to execute a web browser application 119 and contact the provider system 110 and/or application platform 112 using a networking protocol, such as the hypertext transport protocol (HTTP) or the like, to request access to one or more products and/or services associated with the resource system 116. In exemplary embodiments, the application platform 112 authenticates the user and generates the virtual application 114 at run time based upon information and/or data associated with the user and/or the provider system 110 maintained by the database 106. In this regard, the virtual application 114 includes code, data and/or other dynamic web content provided to the client device 118 that can be parsed, executed or otherwise presented by the browser application 119 running on the client device 118.

Still referring to FIG. 1, the application server 102 generally represents a computing system or another combination of other processing logic, circuitry, hardware, and/or other components configured to implement an application platform 104 that accesses the databases 106, 120 and supports the virtual application 114 generated by the provider's application platform 112. In this regard, the application server 102 may include a processing system (e.g., a processor, controller, or the like) that includes or otherwise accesses a memory or another non-transitory computer-readable medium of storing programming instructions for execution by the processing system that, when read and executed by the processing system, cause the application server 102 and/or application platform 104 to generate an entitlement management engine 130 that interfaces with the provider's application platform 112 and/or virtual application 114 and performs various additional tasks, operations, functions, and processes described in greater detail below in the context of FIGS. 2-7.

Depending on the embodiment, the database 106 may be realized as a relational database or another suitable database capable of supporting the operations of the application system 100 described herein. In this regard, the database 106 may maintain one or more data tables which contain data associated with users and/or tenants in the application system 100. In practice, the database 106 includes a database management system or other equivalent software that supports querying the data tables (e.g., determining an optimal query plan and retrieving a particular subset of data) and outputting the result of a query statement to the application server 102 and/or entitlement management engine 130. In exemplary embodiments, the provider system 110 is one tenant supported by the database 106, wherein the database 106 maintains, in association with the provider system 110 (e.g., using a unique tenant identifier assigned to the provider system 110), entitlement definition information received from the provider system 110 via the entitlement management engine 130 that defines the entitlements offered by the provider system 110 and the corresponding entitlement models. Additionally, the database 106 maintains entitlement objects for customers and/or users associated with the provider system 110 (e.g., the user of the client device 118) that are created by the entitlement management engine 130 in response to receiving entitlement configuration information for a particular user from the application platform 112 and/or virtual application 114.

In exemplary embodiments, the database 120 is realized as a non-relational or NoSQL database configured to maintain entitlement usage data corresponding to instances of a customer and/or user of the provider system 110 (e.g., the user of client device 118) accessing or otherwise consuming a product, service, or other resource provided by the provider system 110. In this regard, the database 120 may be realized as a cluster of databases, computers, servers, or the like (e.g., a Hadoop cluster) configured to maintain the entitlement usage data provided by the application platform 112 via the entitlement management engine 130. In exemplary embodiments, for an individual user associated with the provider system 110, the entitlement management engine 130 analyzes and/or summarizes the entitlement usage information for that user that is maintained by the non-relational database 120 to obtain entitlement usage summary data for that user that the entitlement management engine 130 then stores in the database 106, for example, as an entitlement usage object associated with that user and that particular provider system 110.

It should be understood that FIG. 1 is merely one simplified representation of an on-demand application system provided for purposes of explanation and is not intended to limit the subject matter described herein in any way. In this regard, practical embodiments of an on-demand application system may include any number of resource providers and/or client devices supported by the database 106 via any number of application servers.

Figure 2:
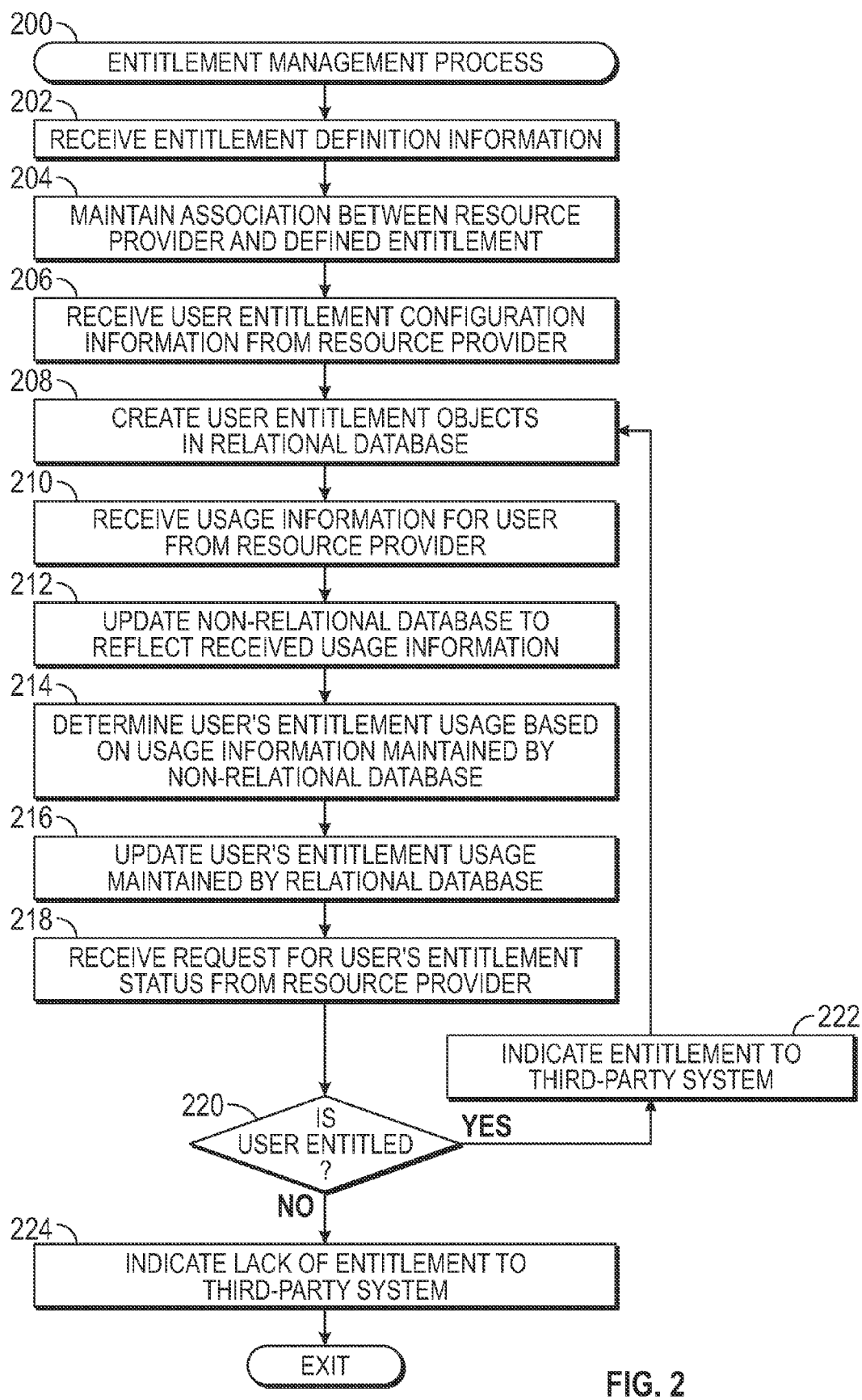
FIG. 2 is a flow diagram of an exemplary entitlement management process suitable for implementation by the application system of FIG. 1.

FIG. 2 depicts an exemplary embodiment of an entitlement management process 200 suitable for implementation by an application system, such as application system 100, to manage entitlements associated with one or more provider systems. For illustrative purposes, the following description may refer to elements mentioned above in connection with FIG. 1. In practice, portions of the entitlement management process 200 may be performed by different elements of the application system 100. That said, in exemplary embodiments, the entitlement management process 200 is performed by the application server 102, the application platform 104 and/or the entitlement management engine 130. It should be appreciated that the entitlement management process 200 may include any number of additional or alternative tasks, the tasks need not be performed in the illustrated order and/or the tasks may be performed concurrently, and/or the entitlement management process 200 may be incorporated into a more comprehensive procedure or process having additional functionality not described in detail herein. Moreover, one or more of the tasks shown and described in the context of FIG. 2 could be omitted from a practical embodiment of the entitlement management process 200 as long as the intended overall functionality remains intact.

Referring to FIG. 2, and with continued reference to FIG. 1, in an exemplary embodiment, the entitlement management process 200 initializes or otherwise begins by receiving or otherwise obtaining entitlement definition information for an entitlement offered by a resource provider and maintaining an association between the entitlement definition information and the resource provider (tasks 202, 204). In this regard, the application server 102 and/or entitlement management engine 130 receives metadata and/or other information defining the structure or configuration of an entitlement offered by the provider system 110. The application server 102 and/or entitlement management engine 130 receives, either from the provider system 110 or from a client device operated by an administrator of the provider system 110, information defining the structure of a particular entitlement, such as, for example, information indicating the resources associated with that entitlement along with qualifying criteria or other information indicating the various limitations, rules and the like that control or otherwise limit the provisioning of resources in connection with the entitlement. The application server 102 and/or entitlement management engine 130 may receive entitlement definition information such as a name or other identifier to be associated with an entitlement, a name or other identifier associated with each respective resource to be associated with that entitlement, an indication of the relationship of one resource of that entitlement with respect to another resource associated with that entitlement (e.g., a parent-child relationship or the like), one or more qualifying values corresponding to allowable quantities of a respective resource (e.g., minimum and/or maximum quantity values or other default values) associated with that entitlement, a time period over which the consumption of a respective resource associated with that entitlement is monitored, and/or other criteria pertaining to the quantities, usage and/or monitoring of a respective resource associated with that entitlement. For example, the application server 102 and/or entitlement management engine 130 may receive the name of a particular product or service offered by the provider system 110, a minimum and/or maximum value for a quantity of that product or service that may be consumed, a corresponding time period over with that product or service may be consumed, an indication of whether the quantity of that product or service consumed over that monitoring time period may exceed the minimum and/or maximum value, an indication of whether a failure to consume the minimum and/or maximum value over can be credited or otherwise rollover to the next monitoring time period, and the like. In this manner, the entitlement definition information corresponds to the entitlement model used by the provider system 110 for that entitlement.

In an exemplary embodiment, the application server 102 and/or entitlement management engine 130 maintains an association between the provider system 110 and the entitlement definition information by creating a corresponding entry or object in the database 106 that includes the unique tenant identifier associated with the provider system 110 along with the received entitlement definition information. As described in greater detail below, the entitlement definition metadata maintained by the database 106 is used to define the structure and/or fields of corresponding custom (or tenant-specific) entitlement objects created by the application server 102 and/or entitlement management engine 130 in the database 106 for individual customers and/or users of the provider system 110. As described in greater detail below in the context of FIGS. 4-7, in accordance with one or more embodiments, an administrator of the provider system 110 utilizes a client device (e.g., client device 118) to access the application server 102 (e.g., by directing the browser application 119 to an address on the network 108 that is associated with the application server 102), wherein the application platform 104 and/or entitlement management engine 130 generates or otherwise provides one or more graphical user interface (GUI) displays that are presented on the client device which are adapted to allow the administrator of the provider system 110 to input or otherwise provide the entitlement definition information to the application server 102.

Still referring to FIG. 2, in exemplary embodiments, the entitlement management process 200 continues by receiving or otherwise obtaining user entitlement configuration information for an entitlement from the resource provider and creating corresponding user entitlement objects in a relational database based on the user entitlement configuration information and the entitlement definition information associated with that entitlement (tasks 206, 208). In this regard, the user entitlement configuration information includes identifying information for the customer and/or user of the provider system 110 who the new instance of an entitlement is going to be associated with along with any user-specific limitations, rules and/or other criteria that control or otherwise limit the entitlement with respect to that user. For example, the user of the client device 118 may manipulate the browser application 119 to access the application platform 112 (e.g., by directing the browser application 119 to an address on the network 108 that is associated with the provider system 110 and/or application platform 112), wherein the application platform 112 generates the virtual application 114 within the browser application 119 that includes one or more GUIs adapted to allow the user of the client device 118 to select or otherwise indicate an entitlement offered by the provider system 110 that the user would like to purchase or otherwise access, along with particular quantities or other criteria for one or more of the resources associated with the selected entitlement that the user would like to be allotted or otherwise entitled to. After the user has indicated the desired quantities for the resources of a selected entitlement and completes selection of that entitlement (e.g., by purchasing the entitlement with those desired quantities), the virtual application 114 may provide, to the entitlement management engine 130, user entitlement configuration information that includes a unique identifier associated with the user of client device 118 that is used by the provider system 110 to authenticate or otherwise authorize the user, the name or identifier associated with the entitlement purchased or otherwise selected by the user, and any user-specific quantities or other criteria for one or more of the resources of that entitlement.

In exemplary embodiments, in response to receiving user entitlement configuration information from the provider system 110, the application platform 104 and/or entitlement management engine 130 creates one or more corresponding user entitlement objects in the relational database based on the received user entitlement configuration information and the entitlement definition information associated with that entitlement. For example, using the tenant identifier associated with the provider system 110 and the name or identifier associated with the entitlement purchased or otherwise selected by the user, the entitlement management engine 130 obtains the entitlement definition metadata from the object or entry in the relational database 106 that includes or is otherwise associated with both those identifiers. The entitlement management engine 130 creates a new custom user entitlement object (or entry) in the relational database 106 that is structured based on the entitlement definition metadata and includes the unique identifier associated with the user and any user-specified quantities, values and/or other criteria for one or more resources associated with that entitlement. In this regard, the user entitlement object includes fields corresponding to the resources identified by the entitlement definition metadata, the allowable quantities for those resources, the usage monitoring time periods for those resources, and any other qualifying criteria for those resources along with a field for the unique user identifier, wherein the fields of the user entitlement object corresponding to any user-specified quantities, values and/or other criteria are set to those values specified or otherwise selected by the user. In exemplary embodiments, the entitlement management engine 130 also creates a custom (or tenant-specific) user entitlement usage object (or entry) in the relational database 106 that is associated with the user's user entitlement object based on the entitlement definition metadata. For example, the user entitlement usage object may include fields corresponding to the quantity of consumption of a resource being monitored (which may be initially set to a value indicating zero consumption), the corresponding time period for monitoring that quantity, along with the qualifying values for that resource. In this regard, a different user entitlement usage object may be created for each different resource identified by the entitlement definition metadata for an entitlement.

After creating the user entitlement objects in the relational database, the entitlement management process 200 continues by receiving or otherwise obtaining usage information pertaining to the user's consumption of one or more resources offered by the resource provider, updating the non-relational database to reflect the usage information, determining the user's corresponding entitlement usage based on the user's usage information stored or otherwise maintained in the non-relational database, and updating the user's entitlement usage maintained in the relational database (tasks 210, 212, 214, 216). In this regard, after the entitlement management engine 130 has created or otherwise established the entitlement objects for the user of the client device 118, the user manipulates the client device 118 and/or browser application 119 to consume or otherwise access the resource system 116 and receive resources from the provider system 110 in accordance with his or her entitlement. In exemplary embodiments, the application platform 112 and/or virtual application 114 monitors the user's consumption and provides the entitlement management engine 130 with an indication of the resources of the resource system 116 consumed by the user and the consumed quantity of that resource. For example, each time the user of the client device 118 consumes an unit of a product or service, the application platform 112 and/or virtual application 114 may provide the entitlement management engine 130 with the identity of the product or service being consumed, the quantity of that product or service that was consumed, and the unique identifier associated with the user of the client device 118 that consumed the product or service. In response to receiving this information from the provider system 110, the entitlement management engine 130 creates a new entry in the non-relational database 120 corresponding to that instance of received usage information that includes the identity of the consumed resource, the consumed quantity of that resource, and the unique identifier associated with the consuming user. In exemplary embodiments, the usage entry in the non-relational database 120 also includes a timestamp indicating when that quantity was consumed to support monitoring the consumption over a particular monitoring time period. In this regard, the application platform 112 and/or virtual application 114 may provide the entitlement management engine 130 with a date and/or time associated with consumption of the product or service.

After updating the non-relational database 120 to reflect the recently received instance of usage information, the entitlement management engine 130 calculates or otherwise determines the user's entitlement usage over the appropriate monitoring period based on the usage information associated with the user. For example, the entitlement management engine 130 may access the relational database 106 to obtain the user entitlement usage object associated with the user and determine the monitoring period for the consumed resource based on the corresponding field(s) of the user entitlement usage object. After determining the monitoring period for a particular resource, the entitlement management engine 130 determines a starting time corresponding to the beginning of the current monitoring period and queries the non-relational database 120 using the identifier associated with that resource and the identifier associated with the user for any instances of consumption of the identified resource by that identified user occurring after the starting time (e.g., usage entries having a timestamp that is preceded by the starting time). After obtaining the usage information for that resource over the current monitoring period, the entitlement management engine 130 determines the user's entitlement usage for the current monitoring period, for example, by determining the cumulative quantity of that resource consumed, and updates the corresponding field of the user's user entitlement usage object to reflect the current usage for that particular resource. In this manner, the entitlement management engine 130 summarizes or otherwise analyzes the individual usage instances for the user to determine the user's entitlement usage that is then stored or otherwise maintained by the user's user entitlement usage object in the relational database 106.

Still referring to FIG. 2, in the illustrated embodiment, the entitlement management process 200 continues by receiving or otherwise obtaining a request for a user's entitlement status for a particular resource offered by a resource provider and determining whether the user is entitled to that resource (tasks 218, 220). In this regard, when the user manipulates the client device 118 and/or browser application 119 to receive, consume or otherwise access a resource from the resource system 116, the application platform 112 and/or the virtual application 114 may transmit a request to the entitlement management engine 130 to determine whether the user is entitled to that resource. For example, the application platform 112 and/or virtual application 114 may transmit a request including the identifier associated with the user of the client device 118 and the identifier associated with the product, service and/or resource the user is attempting to access. Using the user's identifier and the tenant identifier associated with the provider system 110, the entitlement management engine 130 identifies any entitlement objects associated with the user in the relational database 106 to determine whether the user is associated with an entitlement that includes the identified resource. When the user is associated with an entitlement that includes the identified resource, the entitlement management engine 130 obtains or otherwise accesses the user's user entitlement usage object associated with that entitlement object to obtain the user's entitlement usage (or consumption) of that resource. Based on the user's entitlement usage with respect to that product or service along with any other limitations, rules and/or qualifying criteria for that product or service, the entitlement management engine 130 determines whether the user is entitled to that product or service. For example, the entitlement management engine 130 may determine a user is entitled to a requested resource when the user's entitlement usage indicates that the user has not exceeded his or her entitled (or allotted) quantity with respect to that resource or when the user's entitlement usage indicates that the user has exceeded his or her entitled quantity if criteria associated with that resource indicates that the user is allowed to exceed his or her entitled quantity (e.g., overage).

In accordance with one or more embodiments, when the entitlement management process 200 determines a user is entitled to the requested resource, the entitlement management process 200 continues by providing indication that the user is entitled to the resource provider (task 222). For example, when the user's entitlement usage indicates that the user has not exceeded his or her allotted (or entitled) quantity with respect to that resource over the current monitoring period, the entitlement management engine 130 may indicate to the application platform 112 and/or the virtual application 114 that the user is entitled to the resource. In some embodiments, the entitlement management engine 130 may transmit or otherwise provide, to the application platform 112 and/or the virtual application 114, the user's entitled quantity for the requested resource along with the user's current usage with respect to that requested resource over the current monitoring period. When the user is entitled to continue consuming resources from the provider system 110, the loop defined by tasks 210, 212, 214, 216, 218, 220, and 222 of the entitlement management process 200 may repeat as desired throughout operation of the entitlement management process 200 to provide the user with access to resources offered by the provider system 110 and maintain information pertaining to the user's entitlements and usage in the databases 106, 120. Conversely, when the entitlement management process 200 determines a user is not entitled to the requested resource, the entitlement management process 200 continues by providing indication that the user is not entitled to the resource provider (task 224). For example, when the user's entitlement usage indicates that the user has exceeded his or her entitled quantity with respect to that requested resource over the current monitoring period and the overage criteria associated with that requested resource indicates overage is not allowed, the entitlement management engine 130 may indicate to the application platform 112 and/or the virtual application 114 that the user is entitled to the requested resource, wherein the application platform 112 and/or the virtual application 114 responds by denying the client device 118 access to the resource system 116 for that requested resource. In some embodiments, the entitlement management engine 130 may transmit or otherwise provide, to the application platform 112 and/or the virtual application 114, the user's entitled quantity for the requested resource along with the user's current usage with respect to that requested resource over the current monitoring period, thereby allowing the application platform 112 and/or the virtual application 114 to indicate to the user why consumption of the requested resource is being denied.

Figure 3:
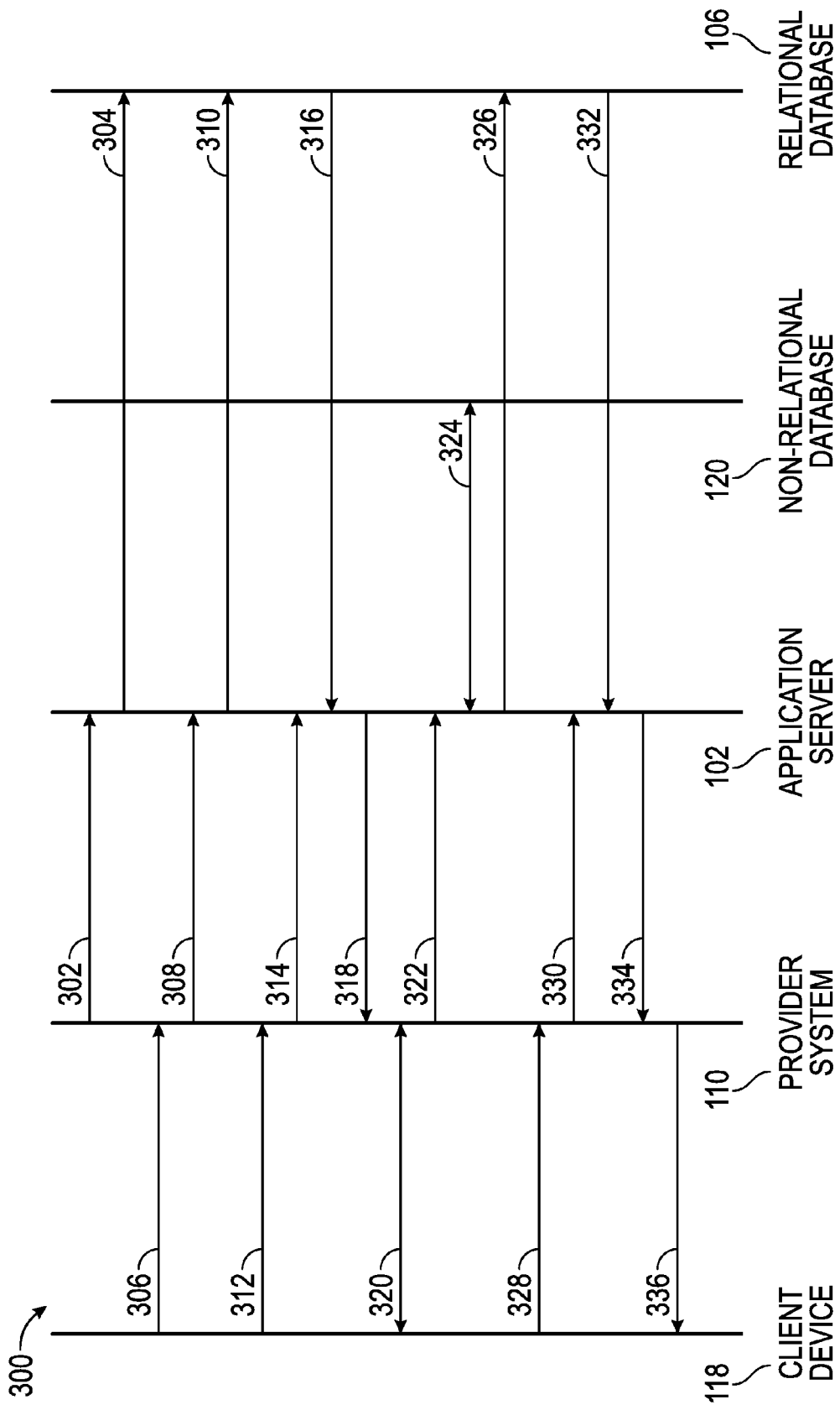
FIG. 3 is a diagram illustrating communications within the application system of FIG. 1 in accordance with one exemplary embodiment of the entitlement management process of FIG. 2.

FIG. 3 illustrates an exemplary sequence 300 of communications within the application system 100 in accordance with an exemplary embodiment of the entitlement management process 200 of FIG. 2. Referring to FIG. 3, and with continued reference to FIGS. 1-2, the illustrated sequence 300 begins with the application server 102 receiving 302 entitlement definition information for an entitlement offered by the provider system 110. As described above, the provider system 110 may transmit or otherwise provide definition information and/or other metadata for an entitlement including, but not limited to, an indication of the resources associated with that entitlement and various qualifying criteria that control or otherwise limit the provisioning of those indicated resources in connection with that entitlement (e.g., default values corresponding to allowable consumed quantities, minimum and/or maximum values for allowable consumed quantities, a monitoring time period for monitoring the consumption of a respective resource, and the like). After receiving the entitlement definition information, the application server 102 updates 304 the relational database 106 to maintain an association between the provider system 110, the defined entitlement, and the definition information and/or metadata associated with that entitlement, for example, by creating an entry or object in the database 106 that includes the unique tenant identifier associated with the provider system 110 along with the received entitlement definition information.

After the provider system 110 has provided the definition information and/or metadata for the entitlements being offered, the provider system 110 may interact with users and/or customers via client devices to provide the resources to individual users and/or customers in accordance with the entitlement definition information. In the illustrated embodiment of FIG. 3, a user of the client device 118 manipulates the browser application 119 to access the virtual application 114 provided by the application platform 112 to purchase, select, configure, or otherwise indicate a desired entitlement, that is, a particular combination of resources that user would like to be able to consume over a particular time period. In response to receiving 306 an indication of the desired entitlement from the client device 118, the provider system 110 transmits or otherwise provides 308 the corresponding user entitlement configuration information to the application server 102. The user entitlement configuration information received from the provider system 110 may include, without limitation, the provider's unique identifier associated with the user of the client device 118 that will be associated with the new instance of an entitlement along with any user-specific and/or user-specified limitations, rules and/or other criteria that control or otherwise limit the entitlement with respect to that user.

As described above, in response to receiving the user entitlement configuration information from the provider system 110, the application server 102 updates 310 the relational database 106 to maintain an association between that user and the selected entitlement by creating custom (or tenant-specific) user entitlement objects in the relational database 106 based on the received user entitlement configuration information and the entitlement definition information associated with that entitlement stored in the relational database 106. In this regard, the entitlement definition information indicates the appropriate fields (and the relationships among them) for that user's corresponding user entitlement object and user entitlement usage object that may be generated or otherwise populated with the values or other user entitlement configuration information in lieu of default values provided by the entitlement definition information. As described above, in exemplary embodiments, each of the user entitlement objects in the database 106 includes or is otherwise associated with the unique identifier assigned to the provider system 110 by the application server 102 along with any unique identifier that may be assigned to the user of the client device 118 by the provider system 110.

After the user's entitlement is created or otherwise registered by the application server 102, the user of the client device 118 manipulates the browser application 119 to transmit or otherwise provide a request 312 to the virtual application 114 to access a particular resource from the resource system 116. In response to receiving the request from the client device 118, the provider system 110 transmits or otherwise provides 314, to the application server 102, a request for the user's entitlement status with respect to that requested resource. In this regard, the entitlement status request includes the identifier associated with the user of the client device 118 along with an identifier associated with the requested resource. In response to the entitlement status request, the application server 102 utilizes the user's identifier to access or otherwise obtain 316 the user's entitlement object(s) from the relational database 106 and determines whether the user of the client device 118 is entitled to the requested resource. In this regard, using the identifier associated with the requested resource, the application server 102 identifies or otherwise obtains the user's usage data for the requested resource over the monitoring period specified by that user's user entitlement configuration information along with the minimum and/or maximum values and/or other metadata for that requested resource provided by the user's entitlement object. In exemplary embodiments, the application server 102 determines whether or not the user is entitled to that requested resource based on the minimum and/or maximum values and/or other metadata for that requested resource and transmits or otherwise provides 318 an indication to the provider system 110 that the user is entitled when the user's usage data indicates the user is entitled to the requested resource. In other embodiments, the application server 102 may transmit or otherwise provide the user's usage data and entitlement configuration information to the provider system 110 to enable the provider system 110 to determine whether or not the user is entitled.

When the user is entitled to the requested resource, the provider system 110 interacts 320 with the client device 118 to enable consumption of the requested resource from the resource system 116 and monitor the consumption of the requested resource. The provider system 110 transmits or otherwise provides 322, to the application server 102, usage information pertaining to the previously requested resource. In response to receiving the usage information, the application server 102 updates 324 the non-relational database 120 to reflect the new instance of usage (or consumption) of that resource by that user then summarizes or otherwise analyzes that user's usage data to determine the user's entitlement usage over the monitoring period for that resource. After determining the user's entitlement usage for that resource, the application server 102 updates 326 the relational database 106 to reflect the updated usage for that resource by modifying the usage data stored or otherwise maintained by the user's user entitlement usage object for that resource.

Still referring to FIG. 3, in the illustrated embodiment, the user of the client device 118 may subsequently manipulate the browser application 119 to transmit or otherwise provide one or more subsequent requests 328 to the virtual application 114 to access a particular product, service and/or resource from the resource system 116. In a similar manner as described above, the provider system 110 transmits or otherwise provides 330 an entitlement status request to the application server 102, and in response to the entitlement status request, the application server 102 accesses 332 the relational database 106 to identify or otherwise obtain the user's usage data for the requested resource over the monitoring period specified by that user's user entitlement configuration information along with the minimum and/or maximum values and/or other metadata for that requested resource provided by the user's entitlement object. In exemplary embodiments, the application server 102 determines whether or not the user is entitled to that requested resource and transmits or otherwise provides 334 an indication to the provider system 110 that the user is not entitled when the user's usage data indicates the user is not entitled to the requested resource, for example, when the user's usage data indicates the user's consumed quantity of that requested resource over a monitoring period meets or exceeds a maximum quantity of consumption over that monitoring period. In other embodiments, the application server 102 transmits or otherwise provides the user's usage data and entitlement configuration information to the provider system 110 to enable the provider system 110 to determine whether or not the user is entitled. When the user is not entitled, the provider system 110 may deny the client device 118 access to the resource system 116 and transmit or otherwise provide 336, to the client device 118, an indication to the user that he or she is not entitled to the requested resource.

FIGS. 4-7 illustrate an exemplary sequence of displays that may be graphically presented by the entitlement management engine 130 and/or application platform 104 within a browser application executing on a client device, such as the browser application 119 on the client device 118, to support defining or otherwise creating an entitlement associated with the provider system 110. In this regard, the displays illustrated in FIGS. 4-7 represent a portion of the visual area on the electronic display device associated with a client device operated by an administrator of the provider system 110 or another user within the application system 100 who is authorized to define or otherwise modify entitlements offered by the provider system 110. In practice, the displays may be realized as or otherwise derived from one or more screens integrated with or otherwise supported by the application platform 104, which may be custom screens specific to the provider system 110 or standard screens supported by the application platform 104, as described in greater detail below in the context of FIG. 8. In accordance with one embodiment, the administrator of the provider system 110 may manipulate a browser application (e.g., browser application 119) to access the application platform 104 and/or entitlement management engine 130 (e.g., by directing the browser application to an address on the network 108 that is associated with the application server 102), wherein the application platform 104 and/or entitlement management engine 130 generates a virtual application within the browser application that includes one or more GUI displays adapted to allow the user of the client device to create, define, or otherwise modify an entitlement offered by the provider system 110. In other embodiments, the administrator of the provider system 110 may manipulate the browser application to access the application platform 112, which, in turn accesses the application platform 104 and/or entitlement management engine 130 to obtain the code, data and/or other dynamic web content for the one or more GUI displays presented by the virtual application 114 within the browser application. In this manner, the GUI displays may be presented on a client device by the entitlement management engine 130 via the provider application platform 112 and/or virtual application 114.

Figure 4:
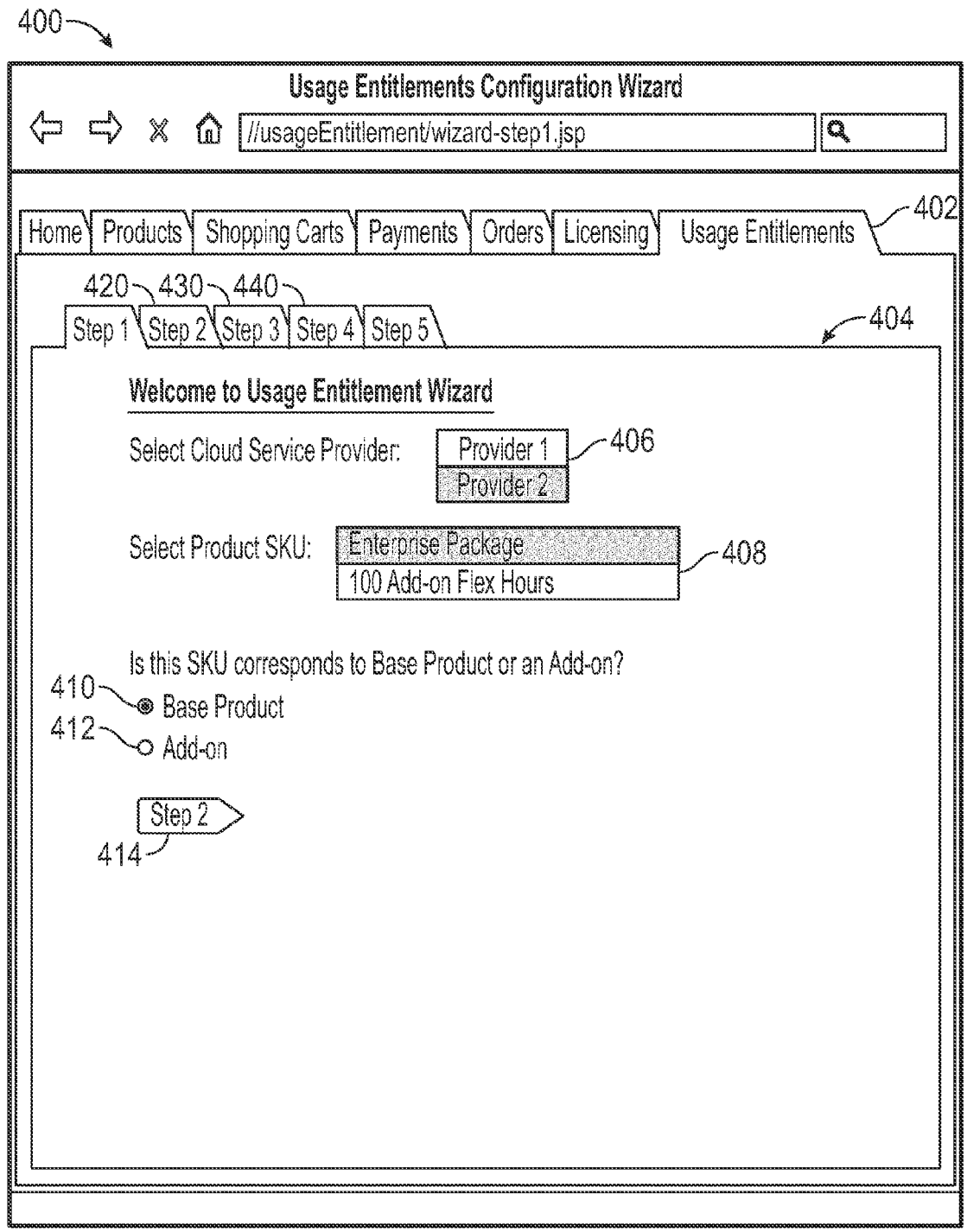
FIGS. 4-7 illustrate exemplary displays that may be presented on a client device in the application system of FIG. 1 in connection with the entitlement management process of FIG. 2 in accordance with one or more exemplary embodiments.

Turning now to FIG. 4, in the illustrated embodiment, the entitlement management engine 130 provides, presents, or otherwise displays a tabbed interface display 400 within a browser application on a client device that includes a tab 402 that may be elected by the user of the client device to create, define, or otherwise modify an entitlement associated with the provider system 110. When the entitlement tab 402 is selected, a second tabbed interface display 404 is presented within the entitlement tab display region that includes one or more GUI elements 406, 408, 410, 412 adapted to allow the user to identify, indicate or otherwise select the entitlement being defined. In the illustrated embodiment, the tabbed interface display 404 includes a first list box 406 adapted to allow the user to select or otherwise indicate the provider system 110 that the entitlement is to be associated with and a second list box 408 adapted to allow the user to select or otherwise indicate the name of the entitlement being defined. In this regard, the list box 406 may be populated with the names or identifiers of provider systems supported by the application server 102 that the user is associated with, and the list box 408 may be populated with the names or identifiers of entitlements associated with the selected provider system in list box 406 that have been previously defined. It should be noted that in other embodiments, the GUI element 408 may be realized as a text box or combo box adapted to allow the user to create or otherwise define new entitlements to be supported by the application server 102. Additionally, the tabbed interface display 404 includes radio buttons 410, 412 adapted to allow the user of the client device to indicate whether the entitlement is a base product or an add-on. In this regard, a base product represents a baseline or lower tier entitlement offered by the provider system 110 at a relatively lower cost and an add-on represents an enhanced or higher tier entitlement offered by the provider system 110 at a relatively higher cost or an otherwise separate entitlement offered by the provider system 110 for an additional cost that may augment or otherwise be combined with a base product.

Figure 5:
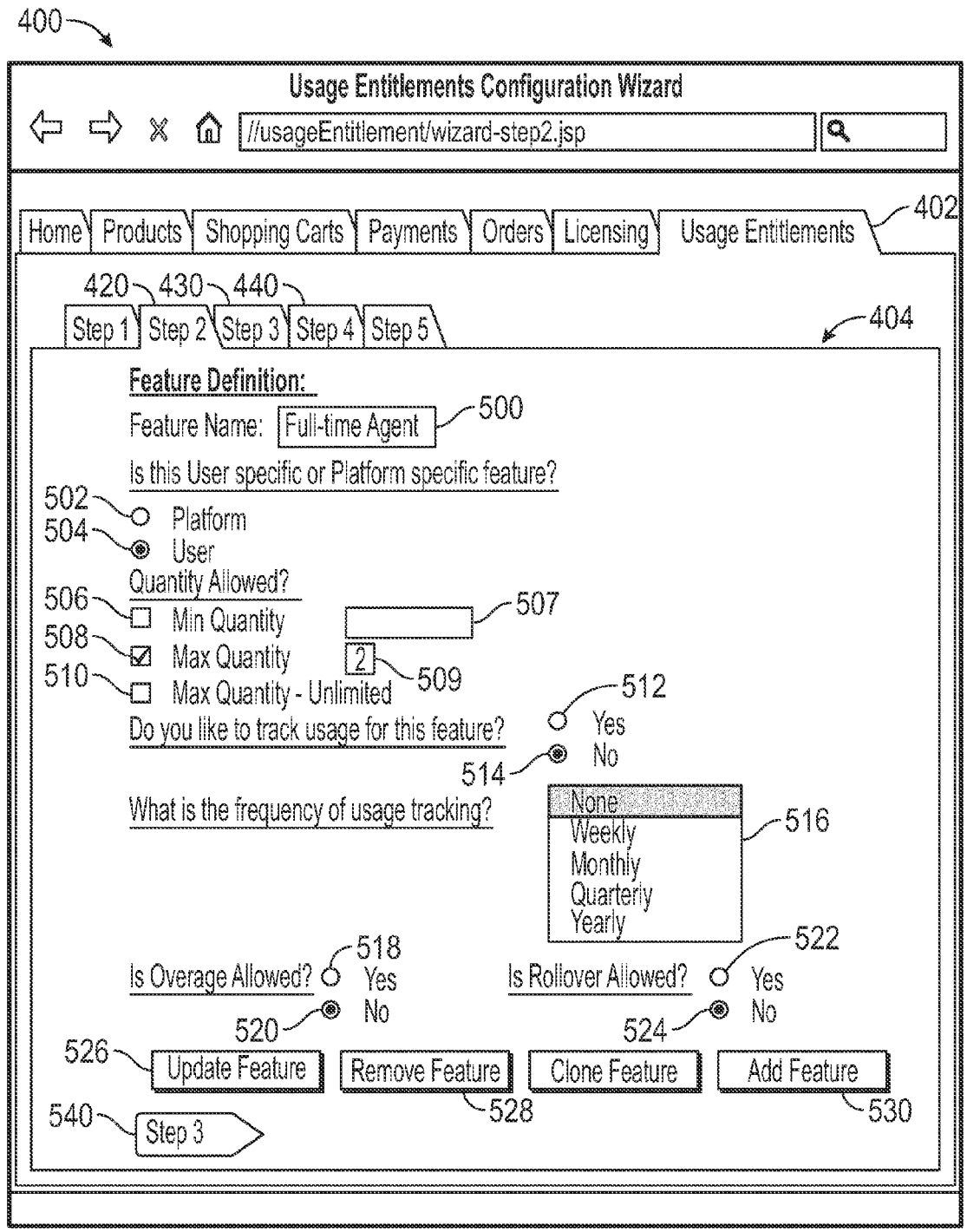

After the user has manipulated the GUI elements 406, 408, 410, 412 to identify, indicate, or otherwise select the entitlement being defined, the user may select another GUI element 414 presented within the second tabbed interface display 404 to advance to the next tab 420 of the second tabbed interface display 404 illustrated by FIG. 5. In this regard, when tab 420 is activated or otherwise selected, the display region of the tabbed interface display 404 includes a plurality of GUI elements adapted to allow the user to identify a particular product, service and/or resource offered by the provider system that is to be associated with the entitlement being defined along with qualifying criteria for the consumption of that product, service and/or resource. In this regard, the tabbed interface display 404 includes a text box 500 adapted to allow the user to input or otherwise indicate the name or identifier associated with that respective product, service and/or resource. In the illustrated embodiment, the tabbed interface display 404 also includes radio buttons 502, 504 adapted to allow the user to select or otherwise indicate whether the resource is a user-specific or platform-specific resource. In this regard, a user-specific resource should be understood as a resource that is consumed and/or monitored via user interaction with the provider system 110 and a platform-specific resource should be understood as a resource that is consumed and/or monitored without or otherwise independently of user interaction with the provider system 110. For example, in an embodiment where the provider system 110 corresponds to a social media monitoring system, a user-specific resource may be a number of licenses offered or a number of topics being monitored as part of an entitlement while a platform-specific resource may be a number of mentions satisfying a topic being monitored that are identified via the network 108 (e.g., on other computer systems). Additionally, the tabbed interface display 404 includes check boxes 506, 508, 510 and associated text boxes 507, 509 adapted to allow the user to input or otherwise indicate minimum and/or maximum values for the quantity of the identified resource that is allowed to be consumed in connection with the current entitlement. For example, as illustrated, the user may select a check box 508 to indicate the identified resource is associated with a maximum allowed quantity for consumption and manipulate the text box 509 to indicate the desired maximum quantity. The second tabbed interface display 404 includes GUI elements, such as radio buttons 512, 514 and list box 516, adapted to allow the user to define the monitoring period associated with the identified resource, as described above. Additionally, in the illustrated embodiment, the tabbed interface display 404 includes radio buttons 518, 520 adapted to allow the user to indicate whether consumption of the identified resource can exceed the maximum quantity over the monitoring period (if a monitoring period is specified) along with radio buttons 522, 524 adapted to allow the user to indicate whether failure to consume the maximum quantity of the identified resource over the monitoring period can be credited to or otherwise utilized to modify the maximum quantity for the subsequent monitoring period.

Still referring to FIG. 5, in the illustrated embodiment, the second tabbed interface display 404 includes a button 526 that may be selected by the user to store or otherwise maintain the association between the identified resource and the currently selected and/or indicated qualifying criteria, wherein in response to selection of the button 526, the entitlement management engine 130 updates the relational database 106 with the entitlement definition information indicated by the GUI elements of the second tabbed interface display 404, thereby maintaining an association between the entitlement currently being defined, the identified resource associated with that entitlement, and its consumption qualifying criteria. The second tabbed interface display 404 may also include a button 528 that may be selected by the user to delete or otherwise remove the identified resource from the current entitlement, along with another button 530 that may be selected by the user to add one or more additional products, services and/or resources to be associated with the current entitlement.

Figure 6:
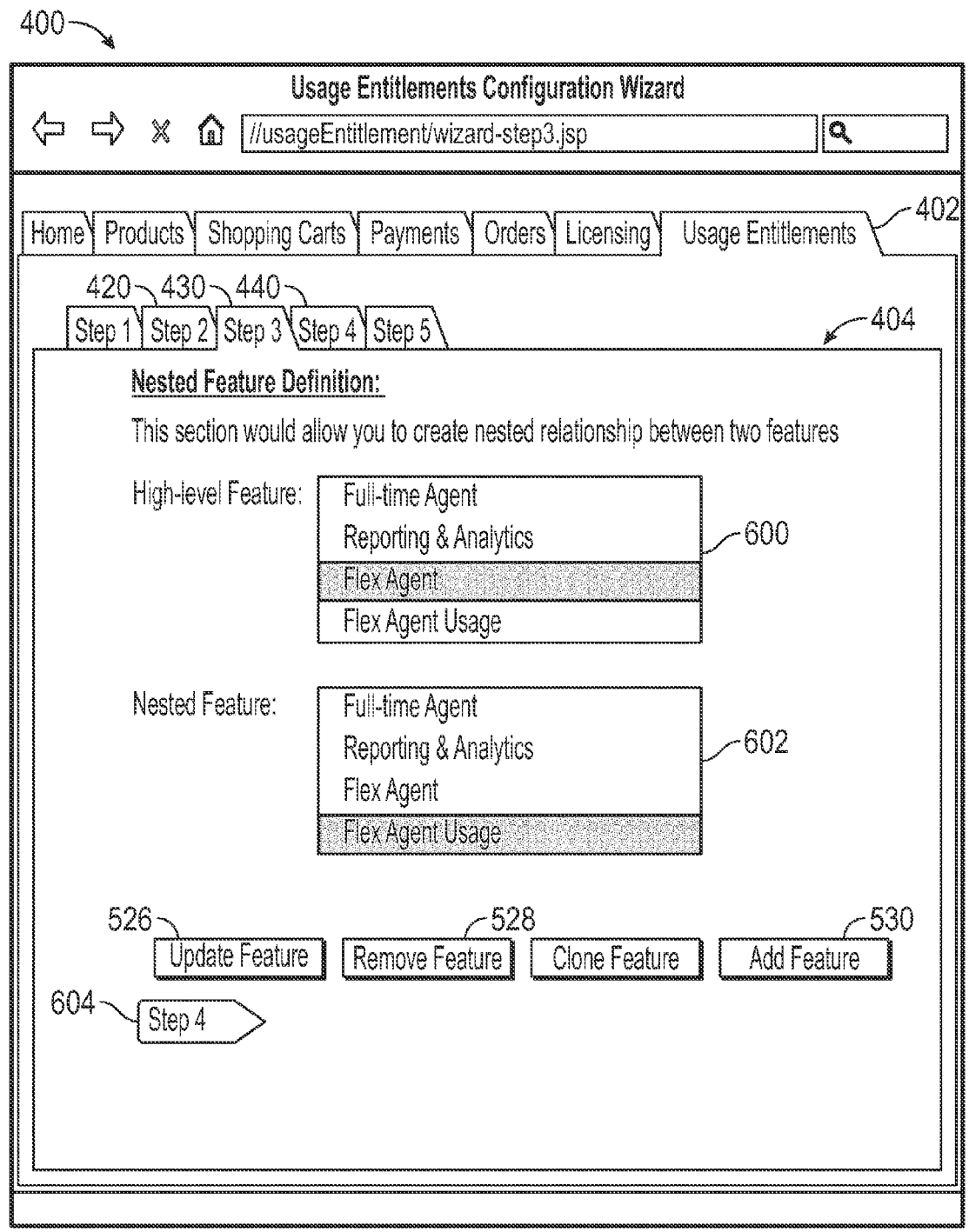
Figure 7:
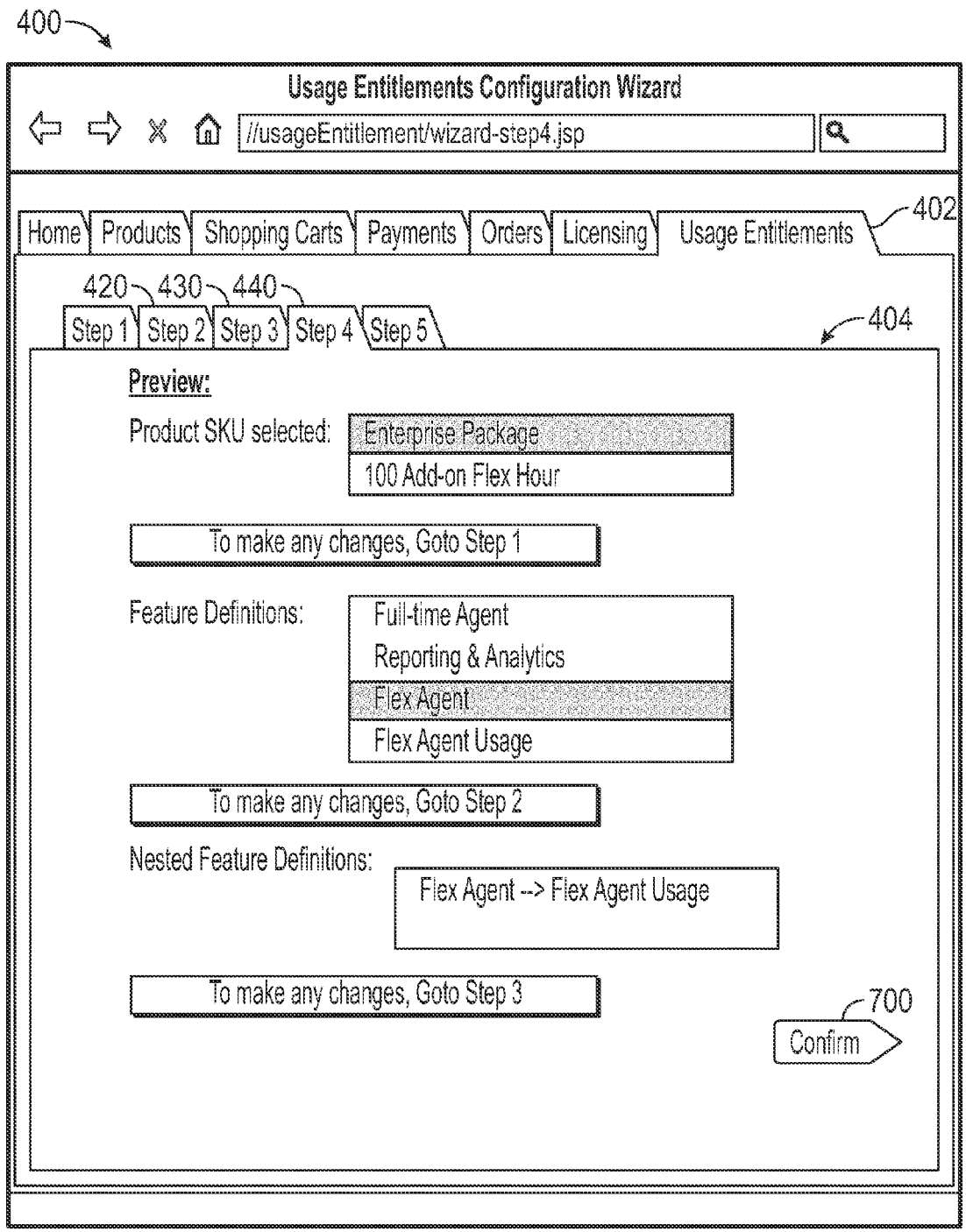

After the user has manipulated the GUI elements to identify, indicate, or otherwise define the desired resources to be associated with the entitlement currently being defined, the user may select a button 540 (or another selectable GUI element) presented within the second tabbed interface display 404 to advance to the next tab 430 of the second tabbed interface display 404 illustrated by FIG. 6. In this regard, when tab 430 is activated or otherwise selected, the display region of the tabbed interface display 404 includes a pair of GUI elements 600, 602, such as list boxes, adapted to allow the user to identify a relationship between resources associated with the current entitlement. For example, the user may select or otherwise identify a parent resource using the first list box 600 and select or otherwise identify a child resource using the second list box 602, thereby indicating that the resource identified via the second list box 602 is associated with the resource identified via the first list box 600 as a child or other subsidiary to the parent resource. In this regard, a child (or nested) resource is defined and/or monitored with respect to a parent resource. For example, a parent resource may be a number of licenses offered by the provider system 110 as part of an entitlement, and a child resource may be an allowable number of logins per license over a given time period as part of the entitlement. The user may select a button 604 (or another selectable GUI element) presented within the second tabbed interface display 404 to advance to the next tab 440 of the second tabbed interface display 404, wherein the second tabbed interface display 404 is updated to present or otherwise display a summary of the entitlement definition information provided by the user, as illustrated by FIG. 7. When the user is satisfied with the provided entitlement definition information, the user may select a button 700 (or another selectable GUI element) within the nested tabbed interface display 404 to cause the entitlement definition information to be transmitted or otherwise provided to the entitlement management engine 130, which, in turn, updates the relational database 106 so that an entry in the relational database 106 corresponds to the defined entitlement and maintains an association between the provider system 110, the name or identifier of the entitlement selected or otherwise indicated by the user, the name or identifier of the resources selected or otherwise indicated by the user as being associated with that entitlement, the consumption qualifying criteria associated selected or otherwise indicated by the user to be associated with each respective resource associated with the entitlement, and any relationship(s) between resources associated with the entitlement.

Figure 8:
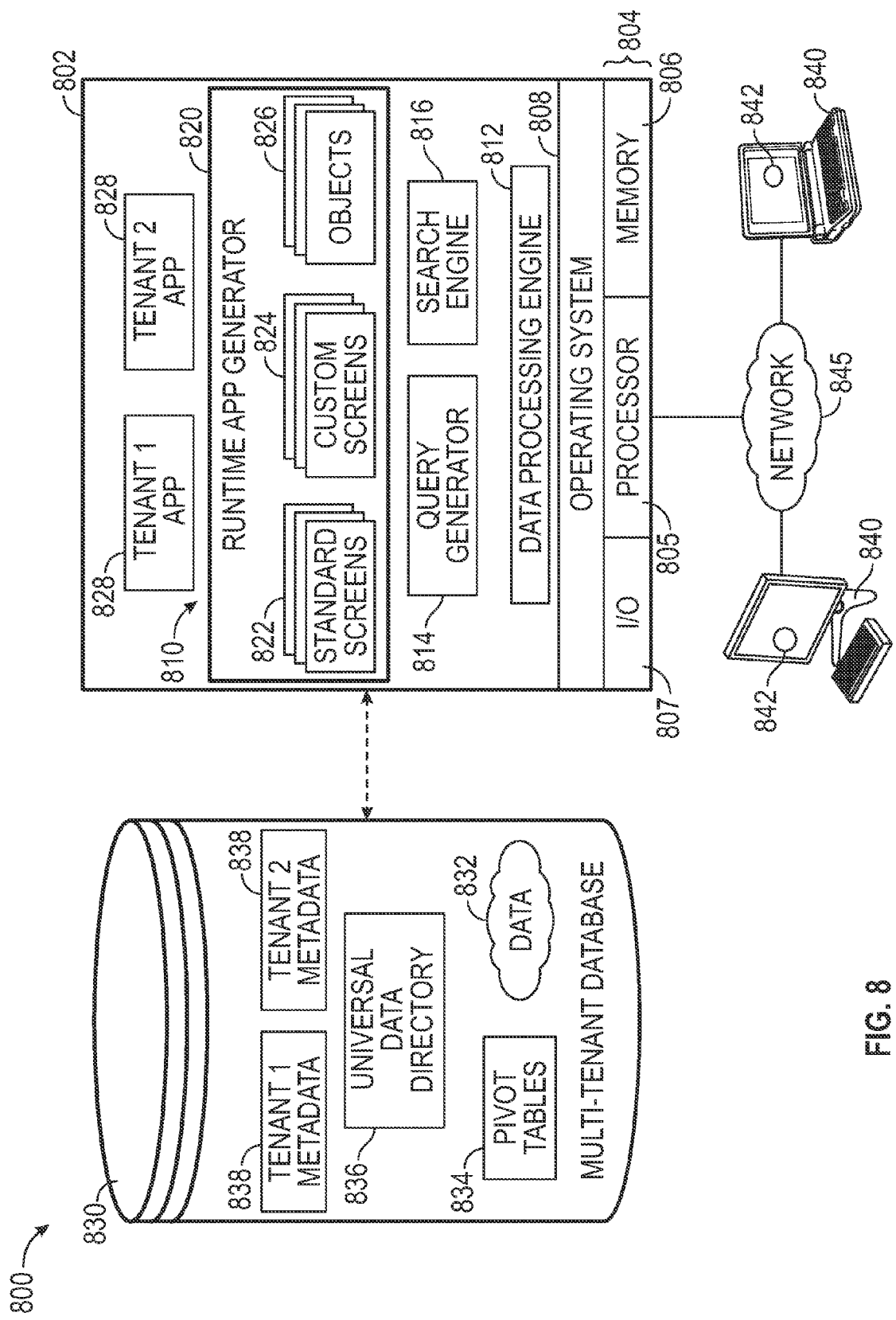
FIG. 8 is a block diagram of an exemplary multi-tenant system suitable for implementation by the application system of FIG. 1 in accordance with one or more embodiments.

Referring now to FIG. 8, in accordance with one or more embodiments, the database 106 is realized as a multi-tenant database that stores or otherwise maintains data associated with a plurality of tenants as part of a multi-tenant system, and the application server 102 provide instances of virtual applications and/or instances of the entitlement management engine 130 to users of multiple different tenants, as described in greater detail below. The illustrated multi-tenant system 800 of FIG. 8 includes a server 802 (e.g., application server 102) that dynamically creates and supports virtual applications 828 based upon data 832 from a common database 830 (e.g., database 106) that is shared between multiple tenants, alternatively referred to herein as a multi-tenant database. Data and services generated by the virtual applications 828 are provided via a network 845 (e.g., network 108) to any number of client devices 840 (e.g., client devices 118, provider system 110, provider application platform 112, or the like), as desired. Each virtual application 828 is suitably generated at run-time (or on-demand) using a common application platform 810 (e.g., application platform 104) that securely provides access to the data 832 in the database 830 for each of the various tenants subscribing to the multi-tenant system 800. In accordance with one non-limiting example, the multi-tenant system 800 is implemented in the form of an on-demand multi-tenant customer relationship management (CRM) system that can support any number of authenticated users of multiple tenants.

As used herein, a "tenant" or an "organization" should be understood as referring to a group of one or more users that shares access to common subset of the data within the multi-tenant database 830. In this regard, each tenant includes one or more users associated with, assigned to, or otherwise belonging to that respective tenant. To put it another way, each respective user within the multi-tenant system 800 is associated with, assigned to, or otherwise belongs to a particular tenant of the plurality of tenants supported by the multi-tenant system 800. Tenants may represent customers, customer departments, business or legal organizations, and/or any other entities that maintain data for particular sets of users within the multi-tenant system 800. For example, the provider system 110 may be one tenant supported by the multi-tenant system 800, with information pertaining to each customer of the provider system 110 being associated with the provider system 110. Although multiple tenants may share access to the server 802 and the database 830, the particular data and services provided from the server 802 to each tenant can be securely isolated from those provided to other tenants. The multi-tenant architecture therefore allows different sets of users to share functionality and hardware resources without necessarily sharing any of the data 832 belonging to or otherwise associated with other tenants.

The multi-tenant database 830 is any sort of repository or other data storage system capable of storing and managing the data 832 associated with any number of tenants. The database 830 may be implemented using any type of conventional database server hardware. In various embodiments, the database 830 shares processing hardware 804 with the server 802. In other embodiments, the database 830 is implemented using separate physical and/or virtual database server hardware that communicates with the server 802 to perform the various functions described herein. In an exemplary embodiment, the database 830 includes a database management system or other equivalent software capable of determining an optimal query plan for retrieving and providing a particular subset of the data 832 to an instance of virtual application 828 in response to a query initiated or otherwise provided by a virtual application 828. The multi-tenant database 830 may alternatively be referred to herein as an on-demand database, in that the multi-tenant database 830 provides (or is available to provide) data at run-time to on-demand virtual applications 828 generated by the application platform 810.

In practice, the data 832 may be organized and formatted in any manner to support the application platform 810. In various embodiments, the data 832 is suitably organized into a relatively small number of large data tables to maintain a semi-amorphous "heap"-type format. The data 832 can then be organized as needed for a particular virtual application 828. In various embodiments, conventional data relationships are established using any number of pivot tables 834 that establish indexing, uniqueness, relationships between entities, and/or other aspects of conventional database organization as desired. Further data manipulation and report formatting is generally performed at run-time using a variety of metadata constructs. Metadata within a universal data directory (UDD) 836, for example, can be used to describe any number of forms, reports, workflows, user access privileges, business logic and other constructs that are common to multiple tenants. Tenant-specific formatting, functions and other constructs may be maintained as tenant-specific metadata 838 for each tenant, as desired. Rather than forcing the data 832 into an inflexible global structure that is common to all tenants and applications, the database 830 is organized to be relatively amorphous, with the pivot tables 834 and the metadata 838 providing additional structure on an as-needed basis. To that end, the application platform 810 suitably uses the pivot tables 834 and/or the metadata 838 to generate "virtual" components of the virtual applications 828 to logically obtain, process, and present the relatively amorphous data 832 from the database 830.

The server 802 is implemented using one or more actual and/or virtual computing systems that collectively provide the dynamic application platform 810 for generating the virtual applications 828. For example, the server 802 may be implemented using a cluster of actual and/or virtual servers operating in conjunction with each other, typically in association with conventional network communications, cluster management, load balancing and other features as appropriate. The server 802 operates with any sort of conventional processing hardware 804, such as a processor 805, memory 806, input/output features 807 and the like. The input/output features 807 generally represent the interface(s) to networks (e.g., to the network 845, or any other local area, wide area or other network), mass storage, display devices, data entry devices and/or the like. The processor 805 may be implemented using any suitable processing system, such as one or more processors, controllers, microprocessors, microcontrollers, processing cores and/or other computing resources spread across any number of distributed or integrated systems, including any number of "cloud-based" or other virtual systems. The memory 806 represents any non-transitory short or long term storage or other computer-readable media capable of storing programming instructions for execution on the processor 805, including any sort of random access memory (RAM), read only memory (ROM), flash memory, magnetic or optical mass storage, and/or the like. The computer-executable programming instructions, when read and executed by the server 802 and/or processor 805, cause the server 802 and/or processor 805 to create, generate, or otherwise facilitate the application platform 810 and/or virtual applications 828 and perform one or more additional tasks, operations, functions, and/or processes described herein. It should be noted that the memory 806 represents one suitable implementation of such computer-readable media, and alternatively or additionally, the server 802 could receive and cooperate with external computer-readable media that is realized as a portable or mobile component or application platform, e.g., a portable hard drive, a USB flash drive, an optical disc, or the like.

The application platform 810 is any sort of software application or other data processing engine that generates the virtual applications 828 that provide data and/or services to the client devices 840. In a typical embodiment, the application platform 810 gains access to processing resources, communications interfaces and other features of the processing hardware 804 using any sort of conventional or proprietary operating system 808. The virtual applications 828 are typically generated at run-time in response to input received from the client devices 840. For the illustrated embodiment, the application platform 810 includes a bulk data processing engine 812, a query generator 814, a search engine 816 that provides text indexing and other search functionality, and a runtime application generator 820. Each of these features may be implemented as a separate process or other module, and many equivalent embodiments could include different and/or additional features, components or other modules as desired.

The runtime application generator 820 dynamically builds and executes the virtual applications 828 in response to specific requests received from the client devices 840. The virtual applications 828 are typically constructed in accordance with the tenant-specific metadata 838, which describes the particular tables, reports, interfaces and/or other features of the particular application 828. In various embodiments, each virtual application 828 generates dynamic web content that can be served to a browser or other client program 842 associated with its client device 840, as appropriate.

The runtime application generator 820 suitably interacts with the query generator 814 to efficiently obtain multi-tenant data 832 from the database 830 as needed in response to input queries initiated or otherwise provided by users of the client devices 840. In a typical embodiment, the query generator 814 considers the identity of the user requesting a particular function (along with the user's associated tenant), and then builds and executes queries to the database 830 using system-wide metadata 836, tenant specific metadata 838, pivot tables 834, and/or any other available resources. The query generator 814 in this example therefore maintains security of the common database 830 by ensuring that queries are consistent with access privileges granted to the user and/or tenant that initiated the request. In this manner, the query generator 814 suitably obtains requested subsets of data 832 accessible to a user and/or tenant from the database 830 as needed to populate the tables, reports or other features of the particular virtual application 828 for that user and/or tenant.

Still referring to FIG. 8, the data processing engine 812 performs bulk processing operations on the data 832 such as uploads or downloads, updates, online transaction processing, and/or the like. In many embodiments, less urgent bulk processing of the data 832 can be scheduled to occur as processing resources become available, thereby giving priority to more urgent data processing by the query generator 814, the search engine 816, the virtual applications 828, etc.

In exemplary embodiments, the application platform 810 is utilized to create and/or generate data-driven virtual applications 828 for the tenants that they support. Such virtual applications 828 may make use of interface features such as custom (or tenant-specific) screens 824, standard (or universal) screens 822 or the like. Any number of custom and/or standard objects 826 may also be available for integration into tenant-developed virtual applications 828. As used herein, "custom" should be understood as meaning that a respective object or application is tenant-specific (e.g., only available to users associated with a particular tenant in the multi-tenant system) or user-specific (e.g., only available to a particular subset of users within the multi-tenant system), whereas "standard" or "universal" applications or objects are available across multiple tenants in the multi-tenant system. The data 832 associated with each virtual application 828 is provided to the database 830, as appropriate, and stored until it is requested or is otherwise needed, along with the metadata 838 that describes the particular features (e.g., reports, tables, functions, objects, fields, formulas, code, etc.) of that particular virtual application 828. For example, a virtual application 828 may include a number of objects 826 accessible to a tenant, wherein for each object 826 accessible to the tenant, information pertaining to its object type along with values for various fields associated with that respective object type are maintained as metadata 838 in the database 830. In this regard, the object type defines the structure (e.g., the formatting, functions and other constructs) of each respective object 826 and the various fields associated therewith.

Still referring to FIG. 8, the data and services provided by the server 802 can be retrieved using any sort of personal computer, mobile telephone, tablet or other network-enabled client device 840 on the network 845. In an exemplary embodiment, the client device 840 includes a display device, such as a monitor, screen, or another conventional electronic display capable of graphically presenting data and/or information retrieved from the multi-tenant database 830. Typically, the user operates a conventional browser application or other client program 842 executed by the client device 840 to contact the server 802 via the network 845 using a networking protocol, such as the hypertext transport protocol (HTTP) or the like. The user typically authenticates his or her identity to the server 802 to obtain a session identifier ("SessionID") that identifies the user in subsequent communications with the server 802. When the identified user requests access to a virtual application 828, the runtime application generator 820 suitably creates the application at run time based upon the metadata 838, as appropriate. As noted above, the virtual application 828 may contain Java, ActiveX, or other content that can be presented using conventional client software running on the client device 840; other embodiments may simply provide dynamic web or other content that can be presented and viewed by the user, as desired.

Referring now to FIGS. 1-8, to briefly summarize, one advantage of the subject matter described herein is that information pertaining to entitlements offered or otherwise provided by the provider system 110 may be managed or otherwise maintained "in the cloud" by the on-demand application server 102 in a manner that accommodates a number of potential entitlement models and allows for the creation of new entitlements and/or modification of existing entitlements without substantially increasing overhead or development resources.

The foregoing description is merely illustrative in nature and is not intended to limit the embodiments of the subject matter or the application and uses of such embodiments. Furthermore, there is no intention to be bound by any expressed or implied theory presented in the technical field, background, or the detailed description. As used herein, the word "exemplary" means "serving as an example, instance, or illustration." Any implementation described herein as exemplary is not necessarily to be construed as preferred or advantageous over other implementations, and the exemplary embodiments described herein are not intended to limit the scope or applicability of the subject matter in any way.

For the sake of brevity, conventional techniques related to computer programming languages, techniques and/or protocols, computer networking, on-demand and/or multi-tenant systems or databases, authentication, data security, and other functional aspects of the systems (and the individual operating components of the systems) may not be described in detail herein. In addition, those skilled in the art will appreciate that embodiments may be practiced in conjunction with any number of system and/or network architectures, data transmission protocols, and device configurations, and that the system described herein is merely one suitable example. Furthermore, certain terminology may be used herein for the purpose of reference only, and thus is not intended to be limiting. For example, the terms "first", "second" and other such numerical terms do not imply a sequence or order unless clearly indicated by the context.

Embodiments of the subject matter may be described herein in terms of functional and/or logical block components, and with reference to symbolic representations of operations, processing tasks, and functions that may be performed by various computing components or devices. Such operations, tasks, and functions are sometimes referred to as being computer-executed, computerized, software-implemented, or computer-implemented. In this regard, it should be appreciated that the various block components shown in the figures may be realized by any number of hardware, software, and/or firmware components configured to perform the specified functions. For example, an embodiment of a system or a component may employ various integrated circuit components, e.g., memory elements, digital signal processing elements, logic elements, look-up tables, or the like, which may carry out a variety of functions under the control of one or more microprocessors or other control devices. In this regard, the subject matter described herein can be implemented in the context of any computer-implemented system and/or in connection with two or more separate and distinct computer-implemented systems that cooperate and communicate with one another. That said, in one or more exemplary embodiments, the subject matter described herein is implemented in conjunction with a virtual customer relationship management (CRM) application in a multi-tenant environment.

While at least one exemplary embodiment has been presented in the foregoing detailed description, it should be appreciated that a vast number of variations exist. It should also be appreciated that the exemplary embodiment or embodiments described herein are not intended to limit the scope, applicability, or configuration of the claimed subject matter in any way. Rather, the foregoing detailed description will provide those skilled in the art with a convenient road map for implementing the described embodiment or embodiments. It should be understood that various changes can be made in the function and arrangement of elements without departing from the scope defined by the claims, which includes known equivalents and foreseeable equivalents at the time of filing this patent application. Accordingly, details of the exemplary embodiments or other limitations described above should not be read into the claims absent a clear intention to the contrary.

What is claimed is:

1. A method of managing entitlements, the method comprising:

providing, by a server, one or more graphical user interface displays including one or more graphical user interface elements for receiving, via a network, entitlement definition information for an entitlement offered by a provider system, the entitlement definition information including metadata defining fields of one or more custom entitlement objects associated with the provider system;

creating, by the server, an object in a database, the object maintaining an association between the provider system and the entitlement definition information;

receiving, by the server via the network, user entitlement configuration information corresponding to the entitlement for a customer of the provider system;

obtaining, by the server, the entitlement definition information for the entitlement offered by the provider system from the object in the database; and creating, by the server, the one or more custom entitlement objects for the customer in the database based on the entitlement definition information and the user entitlement configuration information, the one or more custom entitlement objects including the fields defined by the metadata, wherein the user entitlement configuration information provides one or more user-specific values for one or more of the fields of the one or more custom entitlement objects for the customer, wherein creating the one or more custom entitlement objects comprises:

creating a user entitlement object for the customer based on the entitlement definition information and the user entitlement configuration information, the user entitlement object including fields corresponding to one or more resources associated with the entitlement and one or more qualifying criteria that limit the provisioning of the one or more resources; and creating a user entitlement usage object for the customer based on the entitlement definition information and the user entitlement configuration information, wherein user entitlement usage object includes fields corresponding to a quantity of consumption of a resource of the one or more resources and a qualifying criterion of the one or more qualifying criteria for that resource.

2. The method of claim 1, further comprising determining, by the server, whether the customer is entitled to the resource associated with the entitlement based on the user entitlement usage object after creating the one or more custom entitlement objects in the database, wherein the server provides, to the provider system, an indication of whether the customer is entitled to the resource.

3. The method of claim 2, further comprising receiving, by the server, an entitlement status request for the customer with respect to the resource from the provider system, wherein the server provides the indication in response to the entitlement status request.

4. The method of claim 1, further comprising:

receiving, by the server from the provider system, usage information associated with the resource for the customer; and updating, by the server, the user entitlement usage object of the one or more custom entitlement objects to reflect the usage information.

5. The method of claim 4, further comprising:
creating, by the server, a usage entry associated with the customer in a second database based on the usage information; and
determining, by the server, a usage summary for the customer based at least in part on the usage entry in the second database, wherein updating the user entitlement usage object comprises updating the user entitlement usage object to reflect the usage summary.

6. The method of claim 5, the qualifying criterion comprising a monitoring period for the customer, wherein determining the usage summary comprises determining the usage summary for the monitoring period.

7. The method of claim 1, wherein the qualifying criterion comprises:
a monitoring period associated with the resource.

8. The method of claim 7, further comprising:
receiving usage information associated with the resource for the customer;
creating a usage entry associated with the customer in a second database based on the usage information;
identifying the monitoring period associated with the user entitlement usage object for the customer;
determining a usage summary for the customer over the monitoring period based at least in part on the usage entry in the second database;
updating the user entitlement usage object to reflect the usage summary.

9. The method of claim 8, further comprising:
receiving an entitlement status request for the customer from the provider system;
determining an entitlement status for the customer based on the usage summary and one or more qualifiers associated with the user entitlement object, wherein the entitlement definition information includes the one or more qualifiers; and
indicating the entitlement status to the provider system.

10. The method of claim 1, further comprising:
creating, by the server, the object in the database prior to receiving the user entitlement configuration information, the object including a unique tenant identifier associated with the provider system and the entitlement definition information, wherein the one or more custom entitlement objects include the unique tenant identifier.

11. A system comprising:
a first database; and
an application server comprising a processor and a memory, the application server coupled to the first database to:
provide one or more graphical user interface displays including one or more graphical user interface elements for receiving, via a network, entitlement definition information for an entitlement offered by a provider system, the entitlement definition information including metadata defining fields of one or more custom entitlement objects associated with the provider system;
update the first database to maintain an association between the provider system and the entitlement definition information;
receive, via a network, user entitlement configuration information corresponding to the entitlement for a customer of the provider system; and
update the first database to maintain the one or more custom entitlement objects for the customer based on the entitlement definition information stored in the first database and the user entitlement configuration information, the one or more custom entitlement objects including the fields defined by the metadata, wherein the user entitlement configuration information provides one or more user-specific values for one or more of the fields of the one or more custom entitlement objects for the customer, the one or more custom entitlement objects including:
a user entitlement object for the customer based on the entitlement definition information and the user entitlement configuration information that includes fields corresponding to one or more resources associated with the entitlement and one or more qualifying criteria that limit the provisioning of the one or more resources; and
a user entitlement usage object for the customer based on the entitlement definition information and the user entitlement configuration information that includes fields corresponding to a quantity of consumption of a resource of the one or more resources and a qualifying criterion of the one or more qualifying criteria for that resource.

12. The system of claim 11, further comprising a second database to maintain usage information for the customer, wherein the application server is coupled to the second database to create a usage entry associated with the customer in the second database in response to receiving usage information from the provider system.

13. The system of claim 12, wherein the second database comprises a non-relational database.

14. The system of claim 13, wherein the first database comprises a relational database.

15. The system of claim 13, wherein the first database comprises a multi-tenant database.

16. The system of claim 11, wherein the application server includes an application platform to provide the one or more graphical user interface displays on a client device for receiving the entitlement definition information.

17. A server comprising a processor and a memory, wherein the memory comprises computer-executable instructions that, when executed by the processor, cause the server to:
provide a graphical user interface display on a client device, the graphical user interface display including one or more graphical user interface elements for receiving, via a network, entitlement definition information for an entitlement offered by a provider system, the entitlement definition information including metadata defining fields of one or more custom entitlement objects associated with the provider system;
create an object in a database, the object maintaining an association between the provider system and the entitlement definition information;
receive user entitlement configuration information corresponding to the entitlement for a customer of the provider system;
obtain the entitlement definition information for the entitlement from the object in the database; and
create the one or more custom entitlement objects for the customer in the database based on the entitlement definition information and the user entitlement configuration information, the one or more custom entitlement objects including the fields defined by the metadata, wherein the user entitlement configuration information provides one or more user-specific values for one or more of the fields of the one or more custom entitlement objects for the customer, the one or more custom entitlement objects comprising:

a user entitlement object for the customer based on the entitlement definition information and the user entitlement configuration information that includes fields corresponding to one or more resources associated with the entitlement and one or more qualifying criteria that limit the provisioning of the one or more resources; and a user entitlement usage object for the customer based on the entitlement definition information and the user entitlement configuration information that includes fields corresponding to a quantity of consumption of a resource of the one or more resources and a qualifying criterion of the one or more qualifying criteria for that resource.

18. The server of claim 17, wherein the computer-executable instructions cause the server to determine whether the customer is entitled to the resource associated with the entitlement based on the user entitlement usage object in response to receiving an entitlement status request.

* * * * *